July 12, 1960 P. S. VOSBIKIAN ET AL 2,944,340
SHEARS
Filed July 15, 1959
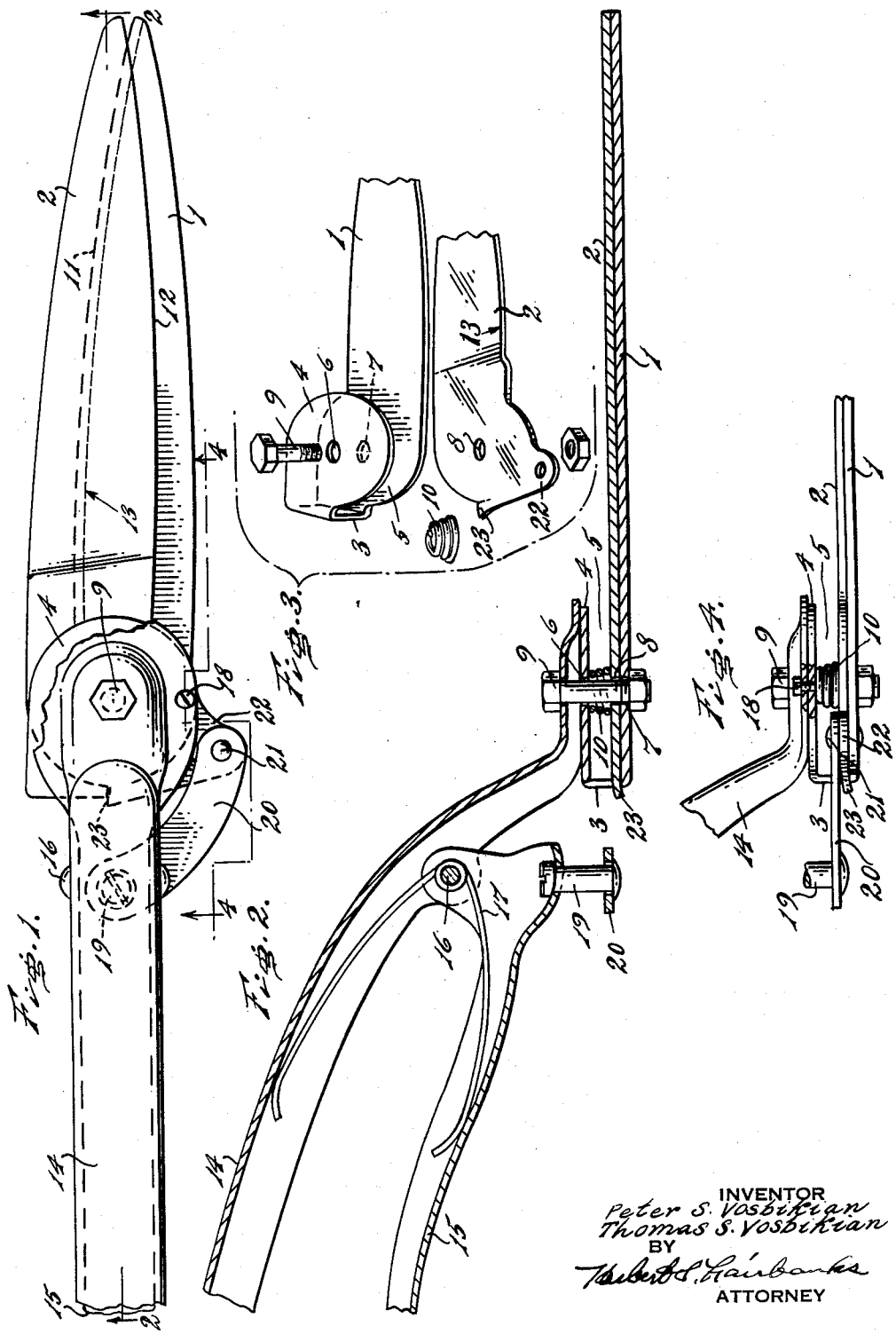
INVENTOR
Peter S. Vosbikian
Thomas S. Vosbikian
BY
ATTORNEY United States Patent Office 2,944,340
Patented July 12, 1960

2,944,340

SHEARS

Peter S. Vosbikian and Thomas S. Vosbikian, both of 20th and Oxford Sts., Melrose, Pa.

Filed July 15, 1959, Ser. No. 827,184

5 Claims. (Cl. 30—248)

The object of this invention is to devise a novel construction, arrangement and assembly of the component parts of shears, thereby providing a novel tensioning of the cutting edges of the blades and an improved cutting action.

A further object of the invention is to provide one of the blades with an outwardly and forwardly extending portion spaced from the end body portion of such blade to thereby provide a space to receive the rear end of the other blade and also to receive a spring forming a tension device to always maintain the contact of the cutting edges of the blades.

The shears may be designed for any desired use, but for purpose of illustration have been shown as grass shears.

With the foregoing and other objects in view as will hereinafter clearly appear, our invention comprehends novel shears having a novel construction and arrangement of the component parts with novel tensioning means for the cutting or other type blades.

For the purpose of illustrating the invention, we have shown in the accompanying drawings a preferred embodiment of it which we have found, in practice, to give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein set forth.

Figure 1 is a top plan view of shears embodying our invention.

Figure 2 is a longitudinal section on line 2—2 of Figure 1.

Figure 3 is an exploded view of certain of the component parts.

Figure 4 is a section on line 4—4 of Figure 1.

Similar numerals of reference indicate corresponding parts.

Referring to the drawings:

The shears have a lower, relatively stationary blade 1 and an upper, relatively movable blade 2. The rear end portion of the blade 1 is bent upwardly as at 3 and then forwardly to provide a forwardly extending, flattened portion 4 spaced from the rear body portion of the plate 1 to provide a space 5 to receive the rear end of the blade 2. Aligned apertures 6 and 7 in the blades 1 and 2 receive a pivot member 9, shown in the form of a bolt and nut.

A coil spring 10 bears against the bottom face of the forward extension 4 of the blade 1 and against the upper face of the rear end of the blade 2, thereby tensioning the blades together so that the cutting edge 11 of the blade 1 can cooperate with the cutting edge 12 of the blade 2. The blade 2 is bent downwardly along a longitudinal line 13 spaced from the cutting edge of the blade 2.

An upper handle 14, U-shaped in cross section, and a lower handle 15, U-shaped in cross section, are connected by a pivot member 16, and a spring 17 passing around the pivot member 16 and has free end portions bearing against the handles and tending to retain them in their open positions. The upper handle has a flattened front portion bearing against the top face of forward extension 4 and is fixed thereto by a screw 18.

The lower handle 15 has a headed rod 19 fixed at one end to it and inclining downwardly and on which one end of a curved link 20 is loosely mounted, the other end of such link being connected by a pivot member 21 to an arm 22 extending laterally and outwardly from the rear end of the movable blade 2. The arm 22 has a contact portion 23 formed from it and which during the closing movements of the blades contacts the bend 3 of the blade 1 to limit the extent of closing movement of the blades.

Special attention is directed to the novel manner of tensioning the blades and the construction and arrangement and assembly of the blades.

It is to be understood that the cooperating edges of the blades may have any desired conformation in accordance with the work to be done such as for example, cutting, gripping or holding of an article.

Having thus described our invention, what we claim as new and desire to secure by Letters Patent is:

1. Shears, comprising a pair of cooperating blades, one of said blades having its rear body portion bent upwardly and forwardly to form a forwardly extending portion spaced from the main body portion, the other of said blades having its rear end located between said blade portions, a spring between the blades tensioning them together, a pivot member extending through said blades, a handle member fixed to the forward extension, and a second handle member pivoted to said first handle member and linked to the rear end of said other blade.

2. Shears, comprising a relative stationary blade and a relatively movable blade, said stationary blade having a main body portion and a forwardly extending portion connected with it but spaced from it, a movable blade having its rear end between said main body portion and forwardly extending portion, a pivot member extending through the blades, a spring bearing against said blades, a handle member fixed to said forwardly extending portion, and a second handle member pivoted to said first handle member and linked to said movable blade.

3. The construction defined in claim 2, wherein the movable blade has a stop portion contacting said stationary blade to limit closing movement of the blades.

4. The construction defined in claim 2, wherein the linkage between the blades comprises a downwardly and forwardly extending rod on said second handle member, and a link mounted at one end on said rod with a clearance and having its other end pivotally connected with the movable blade.

5. Shears, comprising a stationary blade having its rear end bent upwardly and then forwardly to form a forwardly extending portion spaced from the main body portion of the blade, a movable blade having its rear end between the main body portion and forwardly extending portion of the stationary blade, a pivot member extending through the main body portion and forwardly extending portion of the stationary blade and the movable blade, a spring acting between said forwardly extending portion and the movable blade to tension the blades together, a handle member fixed to said forwardly extending portion, and a second handle member pivoted to the first handle member and linked to said movable blade.

References Cited in the file of this patent

UNITED STATES PATENTS

| | | |
|---|---|---|
| 2,689,401 | Kalish | Sept. 21, 1954 |
| 2,795,044 | Henry | June 11, 1957 |
| 2,840,906 | Keiser | July 1, 1958 |